(12) United States Patent
van Schouwen (10) Patent No.: US 12,160,520 B2
(45) Date of Patent: Dec. 3, 2024

(54) SYSTEMS, METHODS, AND STORAGE MEDIA FOR SELECTIVE GRAPH-BASED DISCLOSURE OF A COMPUTER DATA STRUCTURE

(71) Applicant: Bloom Protocol, LLC, Bronx, NY (US)

(72) Inventor: Dustin van Schouwen, Portsmouth, NH (US)

( * ) Notice: Subject to any disclaimer, the term of this patent is extended or adjusted under 35 U.S.C. 154(b) by 365 days.

(21) Appl. No.: 17/654,056

(22) Filed: Mar. 8, 2022

(65) Prior Publication Data

US 2022/0286295 A1 Sep. 8, 2022

Related U.S. Application Data

(60) Provisional application No. 63/158,102, filed on Mar. 8, 2021.

(51) Int. Cl.
*H04L 9/32* (2006.01)
*G06F 16/901* (2019.01)

(52) U.S. Cl.
CPC ........ *H04L 9/3247* (2013.01); *G06F 16/9024* (2019.01)

(58) Field of Classification Search
CPC ..... H04L 9/3247; G06F 16/9024; G06F 21/64
USPC ........................................................ 713/193
See application file for complete search history.

(56) References Cited

U.S. PATENT DOCUMENTS

| | | | |
|---|---|---|---|
| 5,933,498 A | 8/1999 | Schneck | |
| 6,449,718 B1 | 9/2002 | Rucklidge | |
| 8,031,865 B2 | 10/2011 | Stedron | |
| 8,458,187 B2* | 6/2013 | Harrington | G06F 16/3323 707/741 |
| 8,683,223 B2 | 3/2014 | Forlenza et al. | |
| 8,874,769 B2* | 10/2014 | Mao | H04L 9/3247 713/168 |
| 8,904,167 B2* | 12/2014 | Escott | H04B 7/2606 713/153 |
| 9,384,333 B2 | 7/2016 | Sitrick et al. | |
| 9,639,672 B2 | 5/2017 | Lester et al. | |
| 9,843,497 B2* | 12/2017 | Lv | H04L 45/42 |
| 10,320,760 B2* | 6/2019 | Wood | H04L 67/568 |
| 10,425,223 B2 | 9/2019 | Roth et al. | |
| 10,785,022 B2* | 9/2020 | Watanabe | G06F 21/73 |
| 10,824,682 B2 | 11/2020 | Alvares et al. | |
| 10,885,197 B2* | 1/2021 | Block | G06F 21/575 |
| 11,100,197 B1* | 8/2021 | Bernardi | H04L 9/14 |

(Continued)

*Primary Examiner* — Amare F Tabor
(74) *Attorney, Agent, or Firm* — Law Office of Jenna F. Karadbil, P.C.; Juan P. Rodriguez (57) ABSTRACT

Systems, methods, and storage media for selective graph-based disclosure of a computer data structure are disclosed. Exemplary implementations may: generate a plurality of nodes from the computer data structure; generate at least one first subcomponent indicating at least one identifier for each of the plurality of nodes; generate at least one fourth subcomponent for each property possessed by each of the plurality of nodes; cryptographically sign the plurality of subcomponents with a cryptographic private key held by at least one user; assign a common identifier for the computer data structure to each of the plurality of subcomponents; and disclose at least one of the subcomponents by presenting the subcomponent along with a cryptographic signature of the subcomponent by the at least one user.

25 Claims, 8 Drawing Sheets

(56) References Cited

U.S. PATENT DOCUMENTS

| | | |
|---|---|---|
| 11,665,001 B1* | 5/2023 | Engelkemier ............. H04L 9/30 |
| | | 713/2 |
| 2005/0091499 A1 | 4/2005 | Forlenza |
| 2006/0161502 A1 | 7/2006 | Cerruti |
| 2007/0033154 A1 | 2/2007 | Trainum |
| 2007/0250582 A1* | 10/2007 | Sidhu ...................... H04L 51/04 |
| | | 709/204 |
| 2009/0046848 A1 | 2/2009 | Booth |
| 2016/0284020 A1* | 9/2016 | Williams ............. G06Q 20/401 |
| 2021/0320794 A1 | 10/2021 | Auh et al. |
| 2023/0096692 A1* | 3/2023 | Jacobs ................ H04W 12/041 |
| | | 380/270 |

* cited by examiner

SYSTEMS, METHODS, AND STORAGE MEDIA FOR SELECTIVE GRAPH-BASED DISCLOSURE OF A COMPUTER DATA STRUCTURE

CROSS-REFERENCE TO RELATED APPLICATIONS

The present application claims priority under 35 U.S.C. § 119(e) of U.S. Provisional Patent Application Ser. No. 63/158,102 filed on Mar. 8, 2021 and titled SYSTEMS AND METHODS FOR GRAPH-BASED SELECTIVE DISCLOSURE COMMUNICATION, the contents of which are incorporated herein by reference in their entirety.

FIELD OF THE DISCLOSURE

The present disclosure relates to systems, methods, and storage media for selective graph-based disclosure of a computer data structure.

BACKGROUND

Cryptographic signature technology offers methods to validate that information was "signed" in some way by a party in ownership of a specific cryptographic private key, which can be leveraged for purposes such as verification of information, authorization, authentication, and any other act which may involve verifying a statement claim from an individual.

However, a basic cryptographic signature is limited in the sense that the information being signed, or the hash of the information being signed, must be disclosed in full in order for the signature to be validated. Such methods do not allow for atomization of information within a unified data structure or file to partially disclose information contained within the data structure or file. Furthermore, current methods are unable to reconstruct portions of a data structure from the cryptographically signed file that they create.

This background information is provided to reveal information believed by the applicant to be of possible relevance to the present invention. No admission is necessarily intended, nor should be construed, that any of the preceding information constitutes prior art against the present invention.

SUMMARY

One aspect of the present disclosure relates to a system configured for selective graph-based disclosure of a computer data structure. The system may include one or more hardware processors configured by machine-readable instructions. The processor(s) may be configured to generate a plurality of nodes from the computer data structure. The processor(s) may be configured to generate at least one first subcomponent indicating at least one identifier for each of the plurality of nodes. The processor(s) may be configured to generate at least one fourth subcomponent for each property possessed by each of the plurality of nodes. The fourth subcomponent may indicate each property possessed by each node. The processor(s) may be configured to cryptographically sign the plurality of subcomponents with a cryptographic private key held by at least one user. The processor(s) may be configured to assign a common identifier for the computer data structure to each of the plurality of subcomponents. The processor(s) may be configured to disclose at least one of the subcomponents by presenting the subcomponent along with a cryptographic signature of the subcomponent by the at least one user.

In some implementations of the system, the processor(s) may be configured to verify that the plurality of subcomponents share the same common identifier for the computer data structure. In some implementations of the system, the processor(s) may be configured to verify that the plurality of subcomponents are signed with the cryptographic private key of the one user.

In some implementations of the system, the processor(s) may be configured to generate at least one second subcomponent indicating a relationship between each node and at least one other node.

In some implementations of the system, the processor(s) may be configured to generate at least one third subcomponent for each of the plurality of nodes. In some implementations of the system, the third subcomponent listing what properties are may be possessed by each node.

In some implementations of the system, the processor(s) may be configured to generate at least one fifth subcomponents subcomponent for the computer data structure. In some implementations of the system, the fifth subcomponent may include metadata about the computer data structure.

In some implementations of the system, the at least one second subcomponent may include an identifier for the node and the at least one other node.

In some implementations of the system, the at least one third subcomponent may include an identifier and property name associated for each property possessed by each of the plurality of nodes.

In some implementations of the system, the at least one fourth subcomponent may include an identifier, property name, and property value for each property possessed by each of the plurality of nodes.

In some implementations of the system, an unverified subcomponent may prevent the disclosure of the at least one corresponding node.

In some implementations of the system, an unverified subcomponent may prevent the disclosure of the entire computer data structure.

In some implementations of the system, the processor(s) may be configured to associate at least two fourth subcomponents with their corresponding nodes. In some implementations of the system, the processor(s) may be configured to reconstruct a portion of the computer data structure from the association.

In some implementations of the system, the processor(s) may be configured to identify a root node of the data structure from the plurality of nodes. In some implementations of the system, the processor(s) may be configured to find at least one associated second subcomponent associated with the root node. In some implementations of the system, the processor(s) may be configured to find at least one associated node with the root node through the associated second subcomponent. In some implementations of the system, the processor(s) may be configured to associate the root node with the at least one associated node. In some implementations of the system, the processor(s) may be configured to recursively continue the finding and association steps based on the relationship between the associated second subcomponents and at least one associated nodes.

In some implementations of the system, the plurality of nodes may consist of hierarchical data.

In some implementations of the system, the plurality of nodes may consist of non-hierarchical data.

In some implementations of the system, the relationship between the plurality of nodes may form a graph, with nodes forming nodes of the graph and relationships between individual nodes forming an edge of the graph.

In some implementations of the system, the graph may be an acyclic graph.

In some implementations of the system, the graph may be a directed acyclic graph.

In some implementations of the system, the plurality of nodes each may contain cyclical references.

In some implementations of the system, the graph may be a cyclic graph.

In some implementations of the system, the graph may be a directed cyclic graph.

In some implementations of the system, each subcomponent may include a key-value store.

In some implementations of the system, the at least one fourth subcomponent may further include a key-value pair.

Another aspect of the present disclosure relates to a method for selective graph-based disclosure of a computer data structure. The method may include generating a plurality of nodes from the computer data structure. The method may include generating at least one first subcomponent indicating at least one identifier for each of the plurality of nodes. The method may include generating at least one fourth subcomponent for each property possessed by each of the plurality of nodes. The fourth subcomponent may indicate each property possessed by each node. The method may include cryptographically signing the plurality of subcomponents with a cryptographic private key held by at least one user. The method may include assigning a common identifier for the computer data structure to each of the plurality of subcomponents. The method may include disclosing at least one of the subcomponents by presenting the subcomponent along with a cryptographic signature of the subcomponent by the at least one user.

Yet another aspect of the present disclosure relates to a non-transient computer-readable storage medium having instructions embodied thereon, the instructions being executable by one or more processors to perform a method for selective graph-based disclosure of a computer data structure. The method may include generating a plurality of nodes from the computer data structure. The method may include generating at least one first subcomponent indicating at least one identifier for each of the plurality of nodes. The method may include generating at least one fourth subcomponent for each property possessed by each of the plurality of nodes. The fourth subcomponent may indicate each property possessed by each node. The method may include cryptographically signing the plurality of subcomponents with a cryptographic private key held by at least one user. The method may include assigning a common identifier for the computer data structure to each of the plurality of subcomponents. The method may include disclosing at least one of the subcomponents by presenting the subcomponent along with a cryptographic signature of the subcomponent by the at least one user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Figure 1:
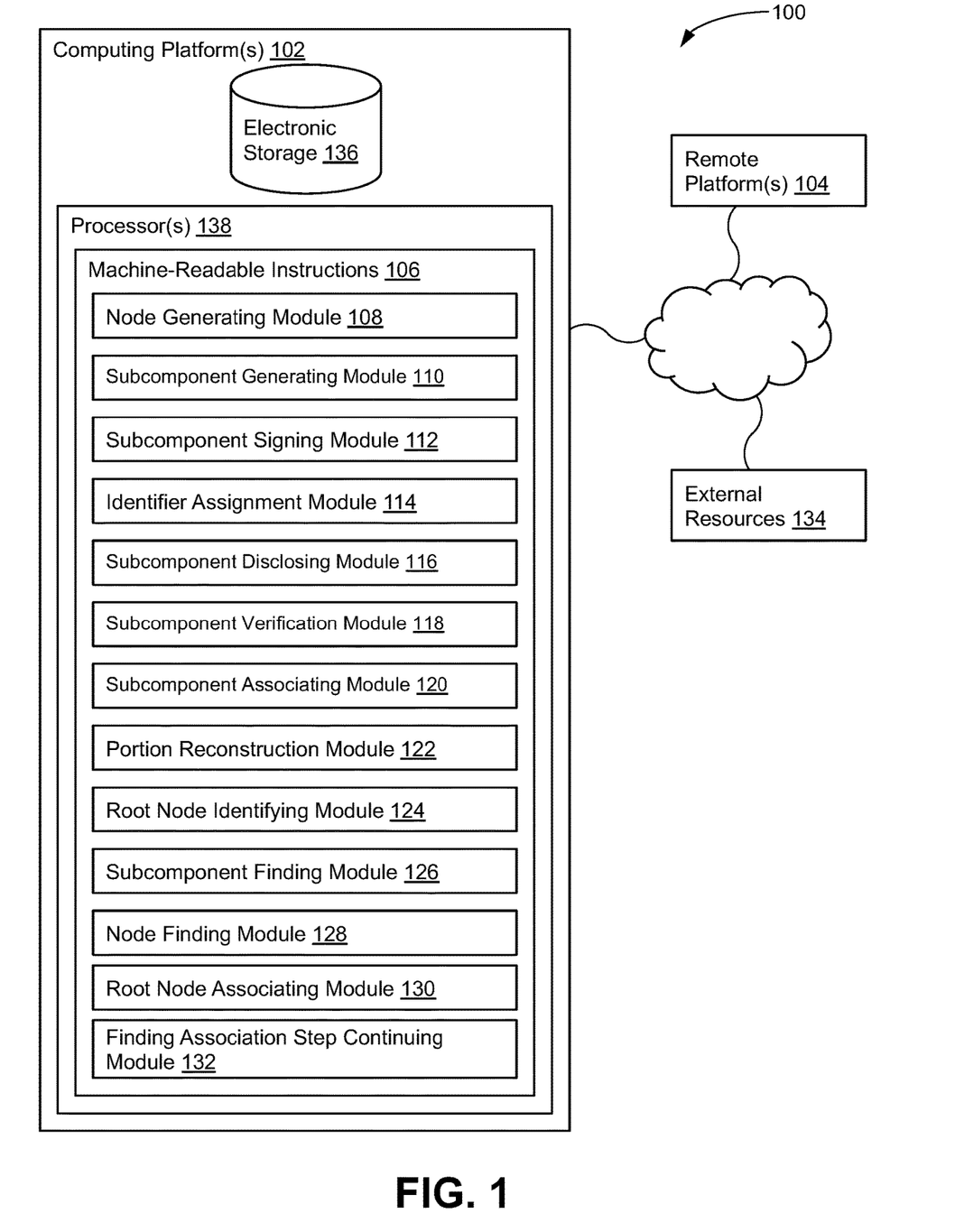
FIG. 1 illustrates a system configured for selective graph-based disclosure of a computer data structure, in accordance with one or more implementations.

FIG. 1 illustrates a system 100 configured for selective graph-based disclosure of a computer data structure, in accordance with one or more implementations. The system 100 allows complex, computer-readable data structures to be verified as a set of related, discrete components while still retaining the complete data structure. A flexible formulation of the original data structure, and appropriate signatures for its subcomponents, can be leveraged to produce individual proofs that allow reconstruction of any subset of the data structure while retaining a guarantee from the author or author-and-signer ("issuer") that the subset is included within the broader data structure itself. This is accomplished by an automated atomic separation of all subcomponents within the data structure, and the generation of cryptographic signatures for every subcomponent of the data structure.

For the sake of an example of how the system 100 may be leveraged in an interoperable manner, we may give the example of the W3C Verifiable Claim standard as to how these individual atomic nodes could be packaged, but any cryptographic signature method with sufficiently non-ambiguous markup denoting the format of the node would be sufficient to establish the intent of the signed data structure.

In some implementations, system 100 may include one or more computing platforms 102. Computing platform(s) 102 may be configured to communicate with one or more remote platforms 104 according to a client/server architecture, a peer-to-peer architecture, and/or other architectures. Remote platform(s) 104 may be configured to communicate with other remote platform(s) 104 via computing platform(s) 102 and/or according to a client/server architecture, a peer-to-peer architecture, and/or other architectures. Users may access system 100 via remote platform(s) 104.

Computing platform(s) 102 may be configured by machine-readable instructions 106. Machine-readable instructions 106 may include one or more instruction modules. The instruction modules may include computer program modules. The instruction modules may include one or more of a node generating module 108, subcomponent generating module 110, subcomponent signing module 112, identifier assignment module 114, subcomponent disclosing module 116, subcomponent verification module 118, subcomponent associating module 120, portion reconstruction module 122, root node identifying module 124, subcomponent finding module 126, node finding module 128, root node associating module 130, finding association step continuing module 132, and/or other instruction modules.

Node generating module 108 may be configured to generate a plurality of nodes from the computer data structure. A data structure may include any form of computer text or image file but may also include more complex data structures such as databases and other larger information stores. The nodes described may possess individual attributes (such as strings, numbers, dates, or other data types). The nodes represent individual objects in the data structure, and the edges represent relationships between those objects, which may be hierarchical or relational.

The plurality of nodes may consist of hierarchical data. The plurality of nodes may also consist of non-hierarchical data. Hierarchical data may include data in which an object mapping keys to values contains a value which is another such object. Non-hierarchical data may include data in which an object mapping keys to values does not contain a value which is another such object.

Once the plurality of nodes are generated by node generating module 108, the relationship between the plurality of nodes may form a graph, with nodes forming nodes of the graph and relationships between individual nodes forming an edge of the graph.

The nodes and edges form a "graph" in the sense of mathematical graph theory—in the case of a hierarchical structure with no references by lower nodes to higher nodes, the nodes and edges can be guaranteed to form a directed acyclic graph. The nodes and edges themselves can be represented as JSON objects, or similar "struct"/"object"-like data structures, with the edges possessing properties describing a unidirectional relationship between nodes.

The plurality of nodes may also each contain cyclical references. The graph may be a cyclic graph. The graph may be a directed cyclic graph. Otherwise, the graph may be an acyclic graph. The graph may be a directed acyclic graph.

Subcomponent generating module 110 may be configured to generate at least one first subcomponent indicating at least one identifier for each of the plurality of nodes.

Each subcomponent may be denoted with markup based on JSON-LD indicating the meta-data of the subcomponent, such as type, unique identifier, absolute position in the data structure when applicable, data indicating relationship data between nodes, property lists, and aliases for metainformation about the node, all depending on the type of the subcomponent. All subcomponents may possess the "@type" property to indicate the type of node and "@vcId" to map the subcomponent to a specific data structure, or similar document, containing all nodes. Generally the @vcId property would correspond to the @id property of the data structure itself, while in many cases the data structure described may be simply the "credentialSubject" property of the data structure, as opposed to the broader data structure. As an example, see the W3C VC specification for reference (an example is presented through https://www.w3.org/TR/vc-data-model/).

The first subcomponent type may be additionally known as the SelectiveNode type. This may indicate an actual object in the data structure (or, in some edge cases, another type of data which is contained within an array). It may possess metaproperties as follows—"@type", @vcId", "@nodeIsRoot", for the case of a hierarchical data structure in which the node is the root/highest node in the structure, "@nodeDepth" for the depth at which the node appears (0 for root, 1 for the children of root, etc.—this property may be made optional), "@nodeId" for a dynamically generated ID to uniquely identify the node (for example, by using the UUID standard defined further within this disclosure), and "@nodeType" to describe the actual "@type" property of the node, for the sake of referential context when the node is viewed in isolation. Additionally, the properties @isPrimitive, @primitiveType, and @primitiveValue may be specified if the node is meant to be explicitly described as a member of an array—@isPrimitive is a boolean to denote a primitive, @primitiveType describes the type of the primitive, including but not limited to "boolean", "string", "number", "array", "null", or "undefined", while @primitiveValue describes the actual value of the primitive, with the exception of "array" or other types where the contents are specified elsewhere as SelectiveNodes.

Subcomponent generating module 110 may also be configured to generate at least one fourth subcomponent for each property possessed by each of the plurality of nodes. By way of non-limiting example, the at least one fourth subcomponent may include an identifier, property name, and property value for each property possessed by each of the plurality of nodes. The at least one fourth subcomponent may further include a key-value pair. The fourth subcomponent may indicate each property possessed by each node.

The fourth subcomponent type may be additionally known as the Selective Property type and is used to denote individual properties possessed by a node. The fourth subcomponent type may possess metaproperties "@type", "@vcId", "@nodeId", "@nodeType", "@property" for the property name, and "@value" for the actual value of the property. If the system 100 is utilizing the JSON format, said format may be any type of JSON-compatible Javascript primitive, including a string, boolean, number, array, "null", or "undefined" value. Non-primitive, complex types such as buffers or non-array objects should be represented as individual nodes, and may not be described as Selective Properties, with the qualification that array objects should be specified as Selective Properties, but the members of said array, even if they are primitives, should be described as SelectiveNodes. Said SelectiveNodes should contain appropriate @isPrimitive/@primitiveType/@primitiveValue properties, as well as the @arrayIndex property on corresponding SelectiveEdges from the SelectiveNode containing the original array.

Subcomponent generating module 110 may also be configured to generate at least one second subcomponent indicating a relationship between each node and at least one other node. The at least one second subcomponent may include an identifier for the node and the at least one other node.

The second subcomponent type may be additionally known as the SelectiveEdge type. The second subcomponent type may also possess the metaproperties of "@type", "@vcId", "@nodeId" and "@nodeType" for its parent/source node, "@property" for the property on the parent/source node pointing to the target node, "@targetNodeId" and "@targetNodeType" for the ID and type of the target node, and the optional "@arrayIndex" property for denoting, respectively, that the source node explicitly has an array type at the property, the index of the node in the array, whether the node isn't a true node but a simple primitive value, and what said value is. The final four properties may be omitted if the computer data structure is intended to be reconstructed as a JSON-LD document, as reconstruction is to array values by default. For reconstructing other data structures where array edges are specified unidirectionally, a node may possess zero or more edges pointing another node. Zero edges in the case of no relationship. One edge in the case of a single unidirectional relationship. Two edges in the case of a bidirectional relationship or doubly mapped unidirectional relationship via different properties, and so forth.

Subcomponent generating module 110 may also be configured to generate at least one third subcomponent for each of the plurality of nodes. The at least one third subcomponent may include an identifier and property name associated for each property possessed by each of the plurality of nodes. The third subcomponent type may list what properties may be possessed by each node.

The third subcomponent type may be also known as the SelectiveNodePropertyList type. The third subcomponent type may be used to denote all the properties possessed by a node. The third subcomponent type may possess the metaproperties "@type", "@vcId", "@nodeId", "@nodeType", and "@properties", an array of unique strings indicating the names of properties ("keys").

Subcomponent generating module 110 may also be configured to generate at least one fifth subcomponent for the computer data structure. The fifth subcomponent may include metadata about the computer data structure.

The fifth subcomponent type may be also known as the SelectiveMeta type. The fifth subcomponent type may be used to denote metainformation about the document, which in one implementation of the system 100 is primarily used to denote metadata pertinent to the W3C Verifiable Credential specification—"@type", "@vcId", "@vcType" for a canonical type of the document, and "@vcContext" for a JSON-LD compliant "context" identifier. In general, this should be provided in any reconstruction of a data structure, particularly of JSON-LD compliant verifiable credential data structures, to provide contextualizing structural information about the data structure. For non-hierarchical relational data, an additional "@nonHierarchical" boolean property may be specified to denote that reconstruction into a hierarchical data structure should not be attempted, but rather that the reconstruction should be conducted through the generation of arrays of nodes and edges with appropriate properties assigned to the nodes.

It should be noted that the ordinal naming convention (first, second, third, etc.) of the subcomponent types does not denote any required order, or any order or preference at all for the functionality of the system 100 or the use of the method 200 as described within this disclosure. The names are utilized to denote differentiation between the various subcomponent types in the present description of the current implementation.

Furthermore, similar data structures can be included representing (a) lists of names of properties ("keys") of nodes and edges, (b) individual properties of nodes, and (c) general "meta" information about the broader document that may not belong in the data structure itself. In one implementation of the system 100 this includes information pertinent to the W3C Verifiable Credential specification, such as verifiable credential "id", "type" and "context".

Subcomponent signing module 112 may be configured to cryptographically sign the plurality of subcomponents with a cryptographic private key held by at least one user. In our technical implementation, this takes the form of a "verifiable credential" as specified by the W3C Verifiable Credential specification.

Identifier assignment module 114 may be configured to assign a common identifier for the computer data structure to each of the plurality of subcomponents. Such an example may include a UUID (universally unique identifier), e.g., "2681230d-cdd3-4f22-8e52-fa2fa49bde69".

Subcomponent disclosing module 116 may be configured to disclose at least one of the subcomponents by presenting the subcomponent along with a cryptographic signature of the subcomponent by the at least one user (Such examples of cryptographic signatures may include those defined by the Cybersecurity & Infrastructure Security Agency (https://www.cisa.gov/uscert/ncas/tips/ST04-018)).

Subcomponent verification module 118 may be configured to verify that the plurality of subcomponents share the same common identifier for the computer data structure.

Subcomponent verification module 118 may also be configured to verify that the plurality of subcomponents are signed with the cryptographic private key of the one user.

Subcomponent associating module 120 may be configured to associate at least two fourth subcomponents with their corresponding nodes.

Portion reconstruction module 122 may be configured to reconstruct a portion of the computer data structure from the association of the at least two fourth subcomponents and their corresponding nodes. Reconstruction of some or all the original data structure is possible using some or all the subcomponents, generally provided to a distinct third party. Reconstruction may be aimed simply at reconstructing the complete document or validating a specific claim against the document.

To begin a reconstruction, the verifier first verifies that all the subcomponents have the same @vcId and that all the subcomponents are individually, cryptographically signed by the issuer. Invalid subcomponents may either be rejected individually or cause the entire validation/reconstruction process of the data structure to fail.

Root node identifying module 124 may be configured to identify a root node of the data structure from the plurality of nodes. The search of the root node may be performed by the system 100 thru the scanning of plurality of first subcomponents in order to determine the root node within the computer data structure.

Subcomponent finding module 126 may be configured to find at least one associated second subcomponent associated with the root node.

Node finding module 128 may be configured to find at least one associated node with the root node through the associated second subcomponent. Like the search for the root node, this search may also be performed by the system 100 thru the scanning of plurality of first subcomponents in order to determine the root node within the computer data structure.

Root node associating module 130 may be configured to associate the root node with the at least one associated node.

Finding association step continuing module 132 may be configured to recursively continue the finding and association steps based on the relationship between the associated second subcomponents and at least one other associated node(s).

In some implementations, an unverified subcomponent may prevent the disclosure of the at least one corresponding node. In some implementations, an unverified subcomponent may prevent the disclosure of the entire computer data structure. In some implementations, each subcomponent may include a key-value store.

In some implementations, computing platform(s) 102, remote platform(s) 104, and/or external resources 134 may be operatively linked via one or more electronic or other communication links. For example, such electronic communication links may be established, at least in part, via a network such as the Internet and/or other networks. It will be appreciated that this is not intended to be limiting, and that the scope of this disclosure includes implementations in which computing platform(s) 102, remote platform(s) 104, and/or external resources 134 may be operatively linked via some other communication mode or media.

A given remote platform 104 may include one or more processors configured to execute computer program modules. The computer program modules may be configured to enable an expert or user associated with the given remote platform 104 to interface with the system 100 and/or external resources 134, and/or provide other functionality attributed herein to remote platform(s) 104. By way of non-limiting example, a given remote platform 104 and/or a given computing platform 102 may include one or more of a server, a desktop computer, a laptop computer, a handheld computer, a tablet computing platform, a NetBook, a Smartphone, a gaming console, and/or other computing platforms.

External resources 134 may include sources of information outside of system 100, external entities participating with system 100, and/or other resources. In some implementations, some or all of the functionality attributed herein to external resources 134 may be provided by resources included in system 100.

Computing platform(s) 102 may include electronic storage 136, one or more processors 138, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 136 may comprise non-transitory storage media that electronically stores information. The electronic storage media of electronic storage 136 may include one or both of system storage that is provided integrally (i.e., substantially non-removable) with computing platform(s) 102 and/or removable storage that is removably connectable to computing platform(s) 102 via, for example, a port (e.g., a USB port, a firewire port, etc.) or a drive (e.g., a disk drive, etc.). Electronic storage 136 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 136 may include one or more virtual storage resources (e.g., cloud storage, a virtual private network, and/or other virtual storage resources). Electronic storage 136 may store software algorithms, information determined by processor(s) 138, information received from computing platform(s) 102, information received from remote platform(s) 104, and/or other information that enables computing platform(s) 102 to function as described herein.

Processor(s) 138 may be configured to provide information processing capabilities in computing platform(s) 102. As such, processor(s) 138 may include one or more of a digital processor, an analog processor, a digital circuit designed to process information, an analog circuit designed to process information, a state machine, and/or other mechanisms for electronically processing information. Although processor(s) 138 is shown in FIG. 1 as a single entity, this is for illustrative purposes only. In some implementations, processor(s) 138 may include a plurality of processing units. These processing units may be physically located within the same device, or processor(s) 138 may represent processing functionality of a plurality of devices operating in coordination. Processor(s) 138 may be configured to execute modules 108, 110, 112, 114, 116, 118, 120, 122, 124, 126, 128, 130, and/or 132, and/or other modules. Processor(s) 138 may be configured to execute modules 108, 110, 112, 114, 116, 118, 120, 122, 124, 126, 128, 130, and/or 132, and/or other modules by software; hardware; firmware; some combination of software, hardware, and/or firmware; and/or other mechanisms for configuring processing capabilities on processor(s) 138. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, 130, and/or 132 are illustrated in FIG. 1 as being implemented within a single processing unit, in implementations in which processor(s) 138 includes multiple processing units, one or more of modules 108, 110, 112, 114, 116, 118, 120, 122, 124, 126, 128, 130, and/or 132 may be implemented remotely from one or more of the other modules. The description of the functionality provided by the different modules 108, 110, 112, 114, 116, 118, 120, 122, 124, 126, 128, 130, and/or 132 described below is for illustrative purposes, and is not intended to be limiting, as any of modules 108, 110, 112, 114, 116, 118, 120, 122, 124, 126, 128, 130, and/or 132 may provide more or less functionality than is described. For example, one or more of modules 108, 110, 112, 114, 116, 118, 120, 122, 124, 126, 128, 130, and/or 132 may be eliminated, and some or all of its functionality may be provided by other ones of modules 108, 110, 112, 114, 116, 118, 120, 122, 124, 126, 128, 130, and/or 132. As another example, processor(s) 138 may be configured to execute one or more additional modules that may perform some or all of the functionality attributed below to one of modules 108, 110, 112, 114, 116, 118, 120, 122, 124, 126, 128, 130, and/or 132.

FIGS. 2A, 2B, 2C, 2D, 2E, 2F, and/or 2G illustrates a method 200 for selective graph-based disclosure of a computer data structure, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIGS. 2A, 2B, 2C, 2D, 2E, 2F, and/or 2G and described below is not intended to be limiting.

In some implementations, method 200 may be implemented in one or more processor(s) 138. The one or more processor(s) 138 may include one or more devices executing some or all of the operations of method 200 in response to instructions stored electronically on an electronic storage 136. The one or more processor(s) 138 may include one or more devices configured through hardware, firmware, and/or software to be specifically designed for execution of one or more of the operations of method 200.

Figure 2A:
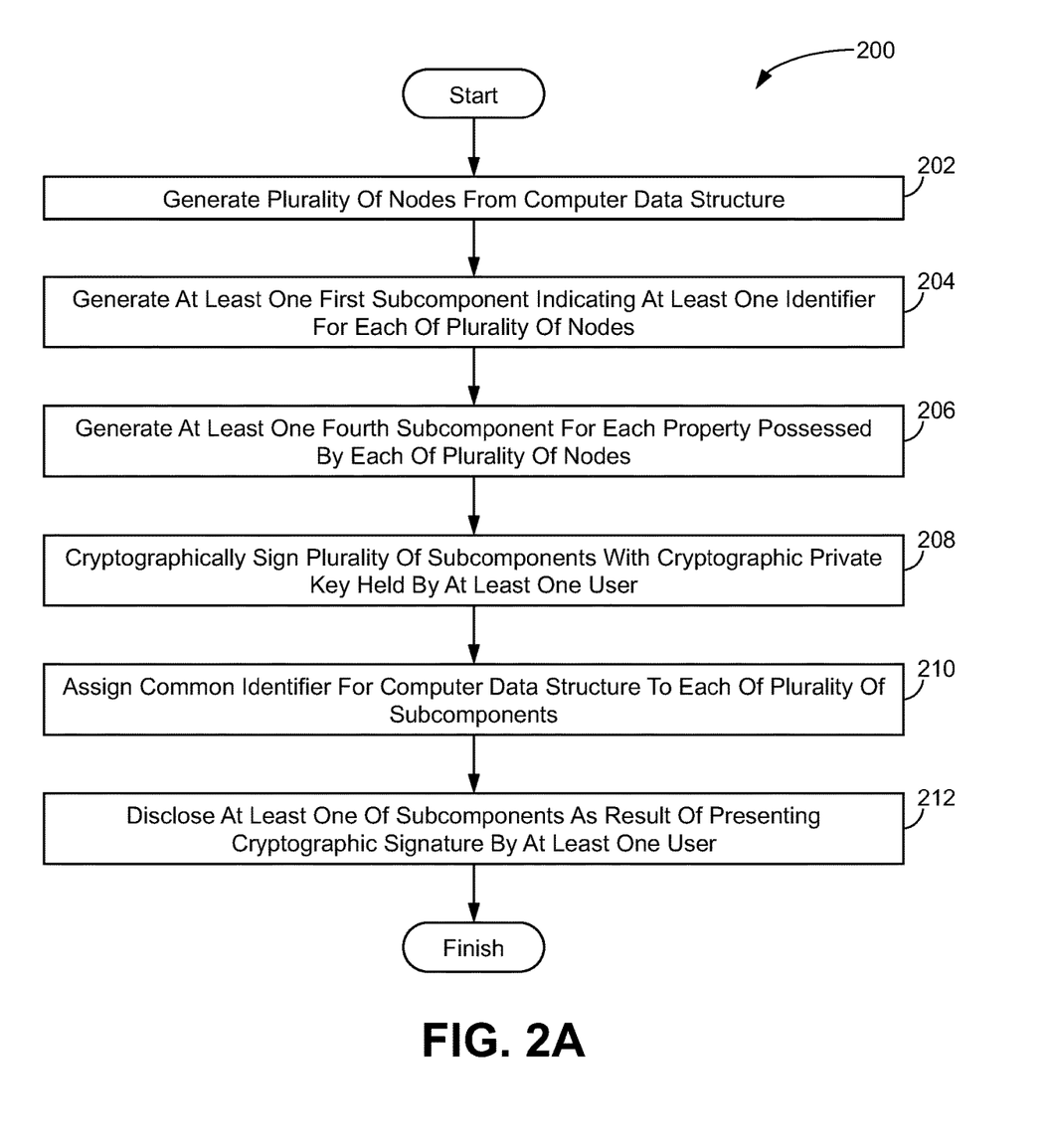
FIGS. 2A, 2B, 2C, 2D, 2E, 2F, and/or 2G illustrate methods for selective graph-based disclosure of a computer data structure, in accordance with one or more implementations.

FIG. 2A illustrates method 200, in accordance with one or more implementations.

An operation 202 may include generating a plurality of nodes from the computer data structure. Operation 202 may be performed by one or more processor(s) 138 configured by machine-readable instructions 106 including a module that is the same as or similar to node generating module 108, in accordance with one or more implementations.

An operation 204 may include generating at least one first subcomponent indicating at least one identifier for each of the plurality of nodes. Operation 204 may be performed by one or more processor(s) 138 configured by machine-readable instructions 106 including a module that is the same as or similar to subcomponent generating module 110, in accordance with one or more implementations.

An operation 206 may include generating at least one fourth subcomponent for each property possessed by each of the plurality of nodes. The fourth subcomponent may indicate each property possessed by each node. Operation 206 may be performed by one or more processor(s) 138 configured by machine-readable instructions 106 including a module that is the same as or similar to subcomponent generating module 110, in accordance with one or more implementations.

An operation 208 may include cryptographically signing the plurality of subcomponents with a cryptographic private key held by at least one user. Operation 208 may be performed by one or more processor(s) 138 configured by machine-readable instructions 106 including a module that is the same as or similar to subcomponent signing module 112, in accordance with one or more implementations.

An operation 210 may include assigning a common identifier for the computer data structure to each of the plurality of subcomponents. The common identifier can be randomly generated by the system 100 or can be generated based on the computer data structure itself. Operation 210 may be performed by one or more processor(s) 138 configured by machine-readable instructions 106 including a module that is the same as or similar to identifier assignment module 114, in accordance with one or more implementations.

An operation 212 may include disclosing disclose at least one of the subcomponents by presenting the subcomponent along with a cryptographic signature of the subcomponent by the at least one user. This disclosure can include either validating the information held within the subcomponent or reconstructing the portion of the data structure contained by the node(s) and associated subcomponent(s). Operation 212 may be performed by one or more processor(s) 138 configured by machine-readable instructions 106 including a module that is the same as or similar to subcomponent disclosing module 116, in accordance with one or more implementations.

Figure 2B:
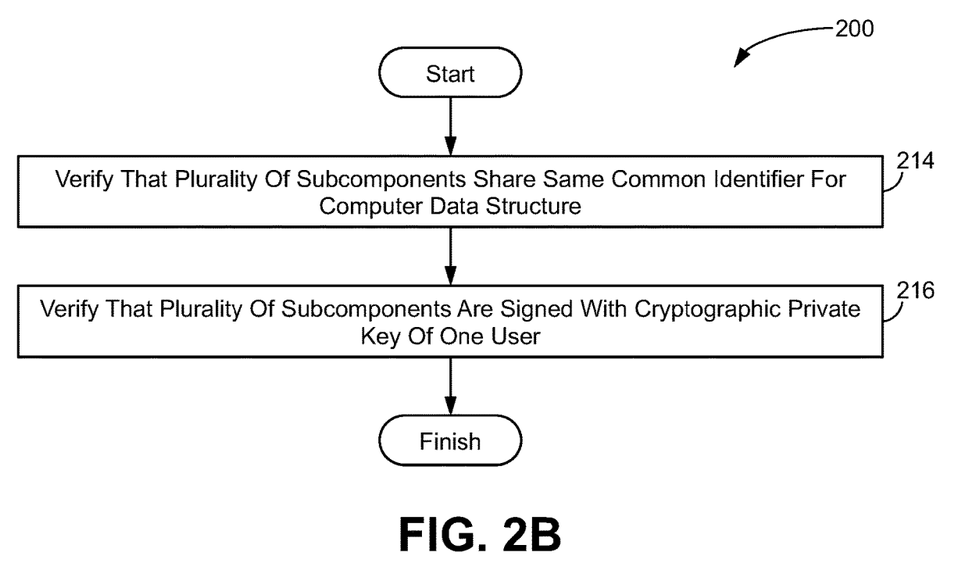

FIG. 2B further illustrates method 200, in accordance with one or more implementations.

An operation 214 may include verifying that the plurality of subcomponents share the same common identifier for the computer data structure. Operation 214 may be performed by one or more processor(s) 138 configured by machine-readable instructions 106 including a module that is the same as or similar to subcomponent verification module 118, in accordance with one or more implementations.

An operation 216 may include verifying that the plurality of subcomponents are signed with the cryptographic private key of the one user. Operation 216 may be performed by one or more processor(s) 138 configured by machine-readable instructions 106 including a module that is the same as or similar to subcomponent verification module 118, in accordance with one or more implementations. Both operations 214 and 216 may be included in the performance of operation 212, depending on the required disclosure by the user.

Figure 2C:
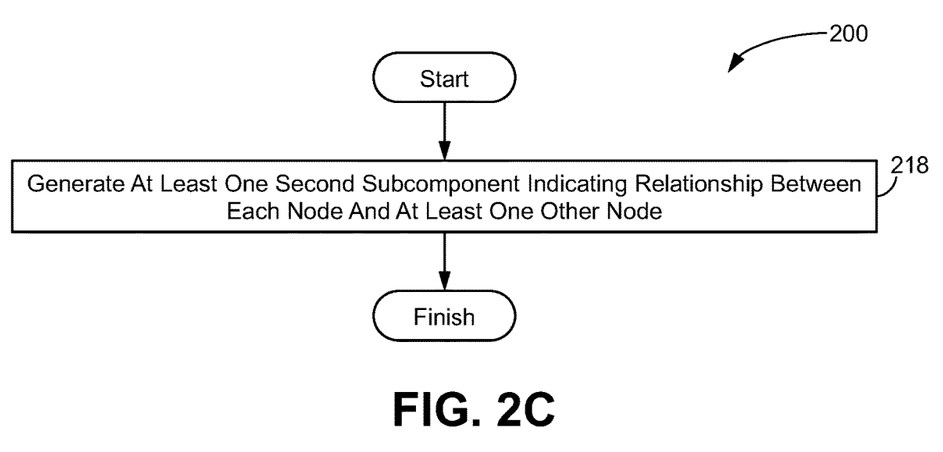

FIG. 2C further illustrates method 200, in accordance with one or more implementations.

An operation 218 may include further including generating at least one second subcomponent indicating a relationship between each node and at least one other node. Operation 218 may be performed by one or more processor(s) 138 configured by machine-readable instructions 106 including a module that is the same as or similar to subcomponent generating module 110, in accordance with one or more implementations.

Figure 2D:
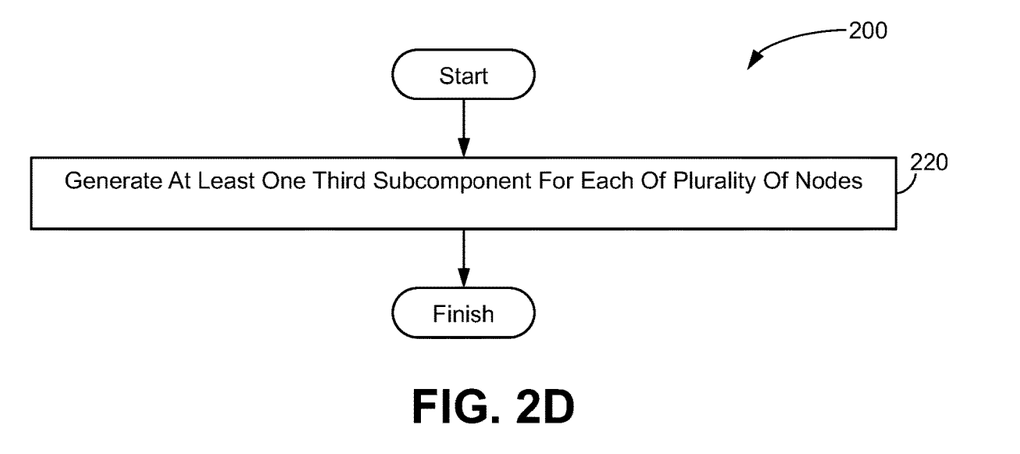

FIG. 2D further illustrates method 200, in accordance with one or more implementations.

An operation 220 may include further including generating at least one third subcomponent for each of the plurality of nodes. The third subcomponent listing what properties may be possessed by each node. Operation 220 may be performed by one or more processor(s) 138 configured by machine-readable instructions 106 including a module that is the same as or similar to subcomponent generating module 110, in accordance with one or more implementations.

Figure 2E:
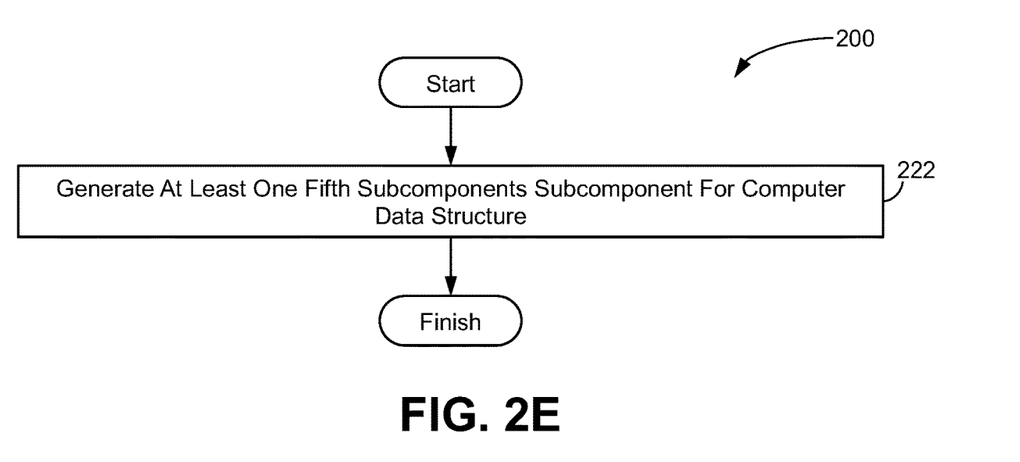

FIG. 2E further illustrates method 200, in accordance with one or more implementations.

An operation 222 may include further including generating at least one fifth subcomponents subcomponent for the computer data structure. The fifth subcomponent may include metadata about the computer data structure. Operation 222 may be performed by one or more processor(s) 138 configured by machine-readable instructions 106 including a module that is the same as or similar to subcomponent generating module 110, in accordance with one or more implementations.

Figure 2F:
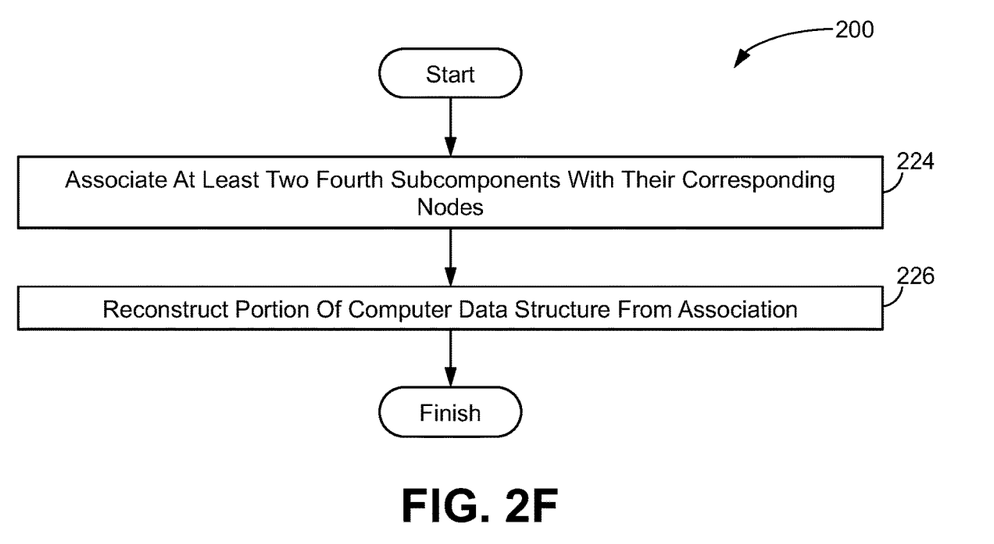

FIG. 2F further illustrates method 200, in accordance with one or more implementations.

An operation 224 may include associating at least two fourth subcomponents with their corresponding nodes. Operation 224 may be performed by one or more processor(s) 138 configured by machine-readable instructions 106 including a module that is the same as or similar to subcomponent associating module 120, in accordance with one or more implementations.

An operation 226 may include reconstructing a portion of the computer data structure from the association of the at least two fourth subcomponents with their corresponding nodes. Operation 226 may be performed by one or more processor(s) 138 configured by machine-readable instructions 106 including a module that is the same as or similar to portion reconstruction module 122, in accordance with one or more implementations.

For non-hierarchical node sets, the reconstruction process simply consists of reassigning primitive values contained in fourth subcomponent type subcomponents onto their corresponding node(s). Additional behavior regarding the treatment of arrays in this case is possible. For example, if a node contains an array that only has primitive members, previously described as a non-hierarchical structure, then the node may be represented using the earlier described method of associating first and second subcomponents, or by using an alternative method of simply assigning the value of the array as the "@property" attribute of the "SelectiveProperty" found in the fourth subcomponent. Generally, using the node identifiers allows for the reconstruction of computer data structure at the start of this process.

Figure 2G:
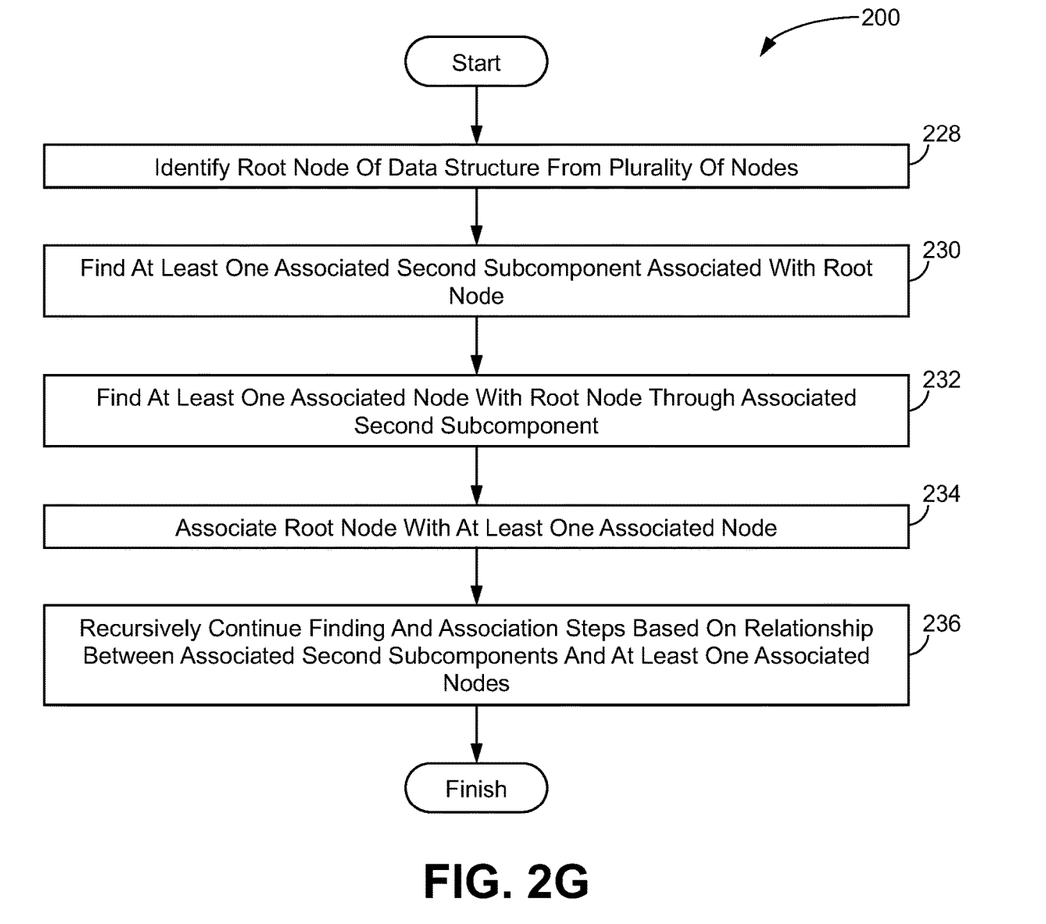

FIG. 2G further illustrates method 200, in accordance with one or more implementations. The reconstruction process branches at this point based on whether the "@nonHierarchical" property is present within the fourth subcomponent type.

An operation 228 may include identifying a root node of the data structure from the plurality of nodes. Operation 228 may be performed by one or more processor(s) 138 configured by machine-readable instructions 106 including a module that is the same as or similar to root node identifying module 124, in accordance with one or more implementations.

An operation 230 may include finding at least one associated second subcomponent associated with the root node. Operation 230 may be performed by one or more processor(s) 138 configured by machine-readable instructions 106 including a module that is the same as or similar to subcomponent finding module 126, in accordance with one or more implementations.

An operation 232 may include finding at least one associated node with the root node through the associated second subcomponent. Operation 232 may be performed by one or more processor(s) 138 configured by machine-readable instructions 106 including a module that is the same as or similar to node finding module 128, in accordance with one or more implementations.

An operation 234 may include associating the root node with the at least one associated node. Operation 234 may be performed by one or more processor(s) 138 configured by machine-readable instructions 106 including a module that is the same as or similar to root node associating module 130, in accordance with one or more implementations.

An operation 236 may include recursively continuing the finding and association steps based on the relationship between the associated second subcomponents and at least one associated nodes. Operation 236 may be performed by one or more processor(s) 138 configured by machine-readable instructions 106 including a module that is the same as or similar to finding association step continuing module 132, in accordance with one or more implementations.

For hierarchical node sets, further full reconstruction must involve identifying a root node, which can be accomplished (for example) by: identifying if only one node exists, and choosing that node, identifying if a node exists for which nodeIsRoot is equal to true, identifying if no edges exist, in which case: the system 100 selects the first node with the lowest specified, non-undefined and non-null nodeDepth value and if no nodeDepths are specified on any nodes, select first node provided and finally identifying the first node for which no edge exists where the @targetNodeId is equal to that node's @nodeId. After identifying the root node, it is possible to reconstruct its descendant nodes recursively.

As an example, assuming that "array" type fourth subcomponent types have already been assigned respectively to the nodes as an empty array and the following steps may be performed, including: finding all second subcomponents with "@sourceNodeId" equal to "@nodeId" of zero, finding all first subcomponents with "@nodeId" contained within the "@targetNodeId" properties in the found set of second subcomponents, assign the first subcomponents according to the "@property" keys of the second subcomponents. In the case of reconstruction of a JSON-LD document, all relationships are assumed to be contained within an array— otherwise, nodes may be assigned directly as a child of their parent node, or in the case of an "array" type fourth subcomponent, they may be inserted into the array created under the node at the index specified by the "@arrayIndex" property. At this point the system 100 may recurse upon itself and operate upon the linked nodes.

At this point the computer data structure should be reconstructed in either its original form or a subset thereof, and specific claims about the content of the original computer data structure may be tested.

Furthermore, a protocol may be specified that allows for specific subsets of a document of a known format to be requested. In keeping with the spirit of using data formats compatible with semantic formatting and queries, the SPARQL language may be used to query documents, or for a better technological support, arbitrary data querying languages, such as variants of SQL, Cypher or other graph database querying languages, or GraphQL, can be used to query the data set and return a result compatible with partial reconstruction. In general, the methods employing these querying languages rely on importing data into the closest available format readable by an interpreter of those querying languages, such as an SQL server, graph database, or GraphQL driver for an arbitrary data source hosting the data.

As will be appreciated by one skilled in the art, aspects of the present invention may be embodied as a system, method or computer program(s). Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program(s) embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium or data store may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: portable computer diskette, hard disk, read only memory (ROM), optically readable storage media (e.g., CD-ROM, DVD), magnetically readable storage media (e.g., magnetic tape, magnetic hard drive, floppy drive), electrical charge-based storage media or random access memory (e.g., EEPROM, RAM), solid-state storage media (e.g., flash drive, solid-state hard drive), other electronically readable storage media and/or any suitable combination of the foregoing. In the context of this disclosure, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and/or any suitable combination of the foregoing.

Computer program code for carrying out operations for aspects of the present invention may be written in any combination of one or more programming languages, including: object oriented programming languages such as Java, Smalltalk, C++, conventional procedural programming languages such as the "C" programming language or similar programming languages, scripting language such as Perl, Javascript/Typescript, and/or VBS, functional languages such as Lisp and/or ML, logic-oriented languages such as Prolog, and/or blockchain smart contract languages such as Solidity, Move, Tezos, fi, and/or Plutus. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a virtual private network (VPN), and/or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program(s) according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or device provide processes for implementing the functions/acts specified in the flowchart and/or block diagram block or blocks.

The flowchart and block diagrams in the figures illustrate the architecture, functionality, and operation of possible implementations of the system(s), method(s) and computer program(s) according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program(s) may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instruction embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively or may include one or more stand-alone components. The hardware and software components of the computer system of the present disclosure may include and may be included within fixed and portable devices such as desktops, laptops, and/or servers. A module may be a component of a device, software, program, or system that implements some "functionality," which can be embodied as software, hardware, firmware, and/or electronic circuitry.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

Furthermore, although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for selective graph-based disclosure of a computer data structure, the system comprising:
   one or more hardware processors configured by machine-readable instructions to:
   generate a plurality of nodes from the computer data structure;
   generate at least one first subcomponent indicating at least one identifier for each of the plurality of nodes;
   generate at least one fourth subcomponent for each property possessed by each of the plurality of nodes, the fourth subcomponent indicating each property possessed by each node;
   cryptographically sign the plurality of subcomponents with a cryptographic private key held by at least one user;
   assign a common identifier for the computer data structure to each of the plurality of subcomponents; and
   disclose at least one of the subcomponents by presenting the subcomponent along with a cryptographic signature of the subcomponent by the at least one user.

2. The system of claim 1, wherein the one or more hardware processors are further configured by machine-readable instructions to:
   verify that the plurality of subcomponents share the same common identifier for the computer data structure;
   verify that the plurality of subcomponents are signed with the cryptographic private key of the at least one user.

3. The system of claim 2, wherein the one or more hardware processors are further configured by machine-readable instructions to generate at least one second subcomponent indicating a relationship between each node and at least one other node.

4. The system of claim 3, wherein the one or more hardware processors are further configured by machine-readable instructions to generate at least one third subcomponent for each of the plurality of nodes, the third subcomponent listing what properties are possessed by each node.

5. The system of claim 4, wherein the one or more hardware processors are further configured by machine-readable instructions to generate at least one fifth subcomponent for the computer data structure, the fifth subcomponent including metadata about the computer data structure.

6. The system of claim 3, wherein the at least one second subcomponent includes an identifier for the node and the at least one other node.

7. The system of claim 4, wherein the at least one third subcomponent includes an identifier and property name associated for each property possessed by each of the plurality of nodes.

8. The system of claim 1, wherein the at least one fourth subcomponent includes an identifier, property name, and property value for each property possessed by each of the plurality of nodes.

9. The system of claim 5, wherein an unverified subcomponent prevents the disclosure of the entire computer data structure.

10. The system of claim 3, wherein the one or more hardware processors are further configured by machine-readable instructions to:
    associate at least two fourth subcomponents with their corresponding nodes;
    reconstruct a portion of the computer data structure from the association.

11. The system of claim 10, wherein the one or more hardware processors are further configured by machine-readable instructions to:
    identify a root node of the data structure from the plurality of nodes;
    find at least one associated second subcomponent associated with the root node;
    find at least one associated node with the root node through the associated second subcomponent;
    associate the root node with the at least one associated node;
    recursively continue the finding and association steps based on the relationship between the associated second subcomponents and at least one associated nodes.

12. The system of claim 3, wherein the relationship between the plurality of nodes forms a graph, with nodes forming nodes of the graph and relationships between individual nodes forming an edge of the graph.

13. A method for selective graph-based disclosure of a computer data structure, the method comprising:
    generating a plurality of nodes from the computer data structure;
    generating at least one first subcomponent indicating at least one identifier for each of the plurality of nodes;
    generating at least one fourth subcomponent for each property possessed by each of the plurality of nodes, the fourth subcomponent indicating each property possessed by each node;
    cryptographically signing the plurality of subcomponents with a cryptographic private key held by at least one user;
    assigning a common identifier for the computer data structure to each of the plurality of subcomponents; and
    disclosing at least one of the subcomponents by presenting the subcomponent along with a cryptographic signature of the subcomponent by the at least one user.

14. The method of claim 13, further comprising:
    verifying that the plurality of subcomponents share the same common identifier for the computer data structure;
    verifying that the plurality of subcomponents are signed with the cryptographic private key of the at least one user.

15. The method of claim 14, further comprising generating at least one second subcomponent indicating a relationship between each node and at least one other node.

16. The method of claim 15, further comprising generating at least one third subcomponent for each of the plurality of nodes, the third subcomponent listing what properties are possessed by each node.

17. The method of claim 16, further comprising generating at least one fifth subcomponent for the computer data structure, the fifth subcomponent including metadata about the computer data structure.

18. The method of claim 15, wherein the at least one second subcomponent includes an identifier for the node and the at least one other node.

19. The method of claim 16, wherein the at least one third subcomponent includes an identifier and property name associated for each property possessed by each of the plurality of nodes.

20. The method of claim 13, wherein the at least one fourth subcomponent includes an identifier, property name, and property value for each property possessed by each of the plurality of nodes.

21. The method of claim 17, wherein an unverified subcomponent prevents the disclosure of the entire computer data structure.

22. The method of claim 15, further comprising:
associating at least two fourth subcomponents with their corresponding nodes; and
reconstructing a portion of the computer data structure from the association.

23. The method of claim 22, further comprising:
identifying a root node of the data structure from the plurality of nodes;
finding at least one associated second subcomponent associated with the root node;
finding at least one associated node with the root node through the associated second subcomponent;
associating the root node with the at least one associated node; and
recursively continuing the finding and association steps based on the relationship between the associated second subcomponents and at least one associated nodes.

24. The method of claim 15, wherein the relationship between the plurality of nodes forms a graph, with nodes forming nodes of the graph and relationships between individual nodes forming an edge of the graph.

25. A non-transient computer-readable storage medium having instructions embodied thereon, the instructions being executable by one or more processors to perform a method for selective graph-based disclosure of a computer data structure comprising:
generating a plurality of nodes from the computer data structure;
generating at least one first subcomponent indicating at least one identifier for each of the plurality of nodes;
generating at least one fourth subcomponent for each property possessed by each of the plurality of nodes, the fourth subcomponent indicating each property possessed by each node;
cryptographically signing the plurality of subcomponents with a cryptographic private key held by at least one user;
assigning a common identifier for the computer data structure to each of the plurality of subcomponents; and
disclosing at least one of the subcomponents by presenting the subcomponent along with a cryptographic signature of the subcomponent by the at least one user.

* * * * *